(12) United States Patent
Bouvy et al.

(10) Patent No.: US 6,582,505 B1
(45) Date of Patent: Jun. 24, 2003

(54) DISPERSION OF PIGMENTS

(75) Inventors: Alain Bouvy, Wezembeek Oppem (BE); Luc Alexander Jozef Mattheus, Testelt (BE)

(73) Assignee: Imperial Chemical Industries PLC, London (GB)

( * ) Notice: Subject to any disclaimer, the term of this patent is extended or adjusted under 35 U.S.C. 154(b) by 263 days.

(21) Appl. No.: 09/692,151

(22) Filed: Oct. 20, 2000

Related U.S. Application Data

(63) Continuation of application No. PCT/GB99/01367, filed on Apr. 30, 1999.

(30) Foreign Application Priority Data

May 14, 1998 (GB) ............................................. 9810233

(51) Int. Cl.$^7$ ........................ B01F 17/42; C09B 67/12; C09D 17/00
(52) U.S. Cl. ....................... 106/410; 106/447; 106/460; 106/476; 516/78; 516/920; 524/88
(58) Field of Search .................. 516/78, 920; 106/410, 106/447, 31.59, 31.89, 460, 476; 524/88

(56) References Cited

U.S. PATENT DOCUMENTS

| | | | | |
|---|---|---|---|---|
| 2,913,417 A | * | 11/1959 | Weeks | |
| 2,927,863 A | | 3/1960 | Malden et al. | |
| 4,334,878 A | * | 6/1982 | Cutler et al. ................... 524/88 |
| 5,069,817 A | * | 12/1991 | Schmid et al. .......... 516/920 X |
| 5,658,376 A | * | 8/1997 | Noguchi et al. ..... 106/31.59 X |
| 5,800,607 A | * | 9/1998 | Schnaitmann et al. .. 106/410 X |
| 5,837,043 A | * | 11/1998 | Wong et al. ......... 106/31.59 X |
| 5,910,529 A | * | 6/1999 | Wollner .................... 516/78 X |
| 6,379,443 B1 | * | 4/2002 | Komatsu et al. ..... 106/31.59 X |

OTHER PUBLICATIONS

Database WPI, Section Ch, Week 8702, Derwent Publications Ltd., XP002113148, Dec. 2, 1986.

* cited by examiner

*Primary Examiner*—Richard D. Lovering
(74) *Attorney, Agent, or Firm*—Pillsbury Winthrop LLP

(57) ABSTRACT

Aqueous pigment dispersions include branched alcohol alkoxylates of formula (I) as set forth in the specification and claims. The total dispersant used may include at least 40% by weight of the branched alcohol alkoxylate. The pigment dispersion is effective for a wide variety of pigments, including, inorganic pigments, organic pigments and carbon black. The pigment dispersions are useful, for example, in paints and other surface coatings.

20 Claims, No Drawings

DISPERSION OF PIGMENTS

This is a Continuation of International Appln. No. PCT/GB99/01367 filed Apr. 30, 1999 which designated the U.S.

This invention relates to dispersions and in particular to aqueous dispersions of pigments, their production and use in paint and surface coating formulations.

Surfactants are frequently used to help in dispersing pigments used in the manufacture of paint and surface coating formulations. Alkyl phenol alkoxylates, especially ethoxylates (APE's), are commonly used for this purpose. Although they are effective surfactants, APE's are increasingly coming under scrutiny for alleged adverse environmental effects. Accordingly replacements for these surfactants have been sought for some time.

The present invention is based on our finding that certain classes of alcohol alkoxylates, particularly ethoxylates, can give aqueous pigment dispersions and paints and surface coating formulations including such dispersions with properties comparable with APE dispersants.

Accordingly, the present invention provides an aqueous dispersion of a pigment which includes as a dispersant at least one branched primary alcohol alkoxylate of the formula (I):

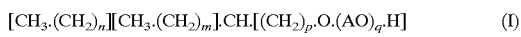

$$[CH_3.(CH_2)_n][CH_3.(CH_2)_m].CH.[(CH_2)_p.O.(AO)_q.H] \quad (I)$$

where n and m are each independently from 1 to 13; and p is 1 or 2;

such that n+m+p is from 5 to 19, particularly from 7 to 17;

AO is an alkylene oxide residue having from 2 to 4 carbon atoms and is particularly an ethylene oxide residue, a propylene oxide residue or a mixture of ethylene oxide and propylene oxide residues; and q is from 5 to 40.

In compounds of the formula (I), n and m are desirably each independently at least 2 and not more than 12, p is desirably 1 and the total number of carbon atoms in the branched alkyl residue is desirably from 10 to 20, particularly 12 to 18 (corresponding to n+m+p from 7 to 17, particularly 9 to 15).

The alkylene oxide groups are desirably all ethylene oxide residues although mixtures of ethylene oxide and propylene oxide residues, particularly having a molar ratio of ethylene oxide residues to propylene oxide residues of from 1:5 to 10:1, can be used even though they will be less hydrophilic than polyethoxylates. When the alkylene oxide residues are mixed ethylene oxide and propylene oxide residues, the polyalkyleneoxy chain can be a random or block copolymeric chain. Within the range 5 to 40, q is desirably 5 to 25. More specific ranges depend on the nature of the pigment being dispersed (see below). The relative size of the hydrophile and hydrophobe will affect the HLB of the dispersing agent and these relative sizes may be chosen to provide specific properties in this respect depending on the circumstances of use. The number of units in the polyoxyalkylene chain, 'q', is an average value and may be non-integral.

The alkoxylate compounds of the formula (I) used in this invention can be made by alkoxylation of the corresponding ranched primary alcohols under conventional alkoxylation conditions, typically under alkali catalysis, particularly alkoxide catalysis e.g. using NaOH or KOH to form alkoxide in situ). The branched primary alcohols can be substantially wholly branched alcohols as can be made by the guerbet process e.g. 2-butyloctanol, 2-butyldecanol, 2-butyldodectanol, 2-hexyloctanol, 2-hexyldecanol, 2-hexyldodecanol and 2-octyldecanol; or they can be mixtures of the above branched primary alcohols with linear primary alcohols (or analogous alcohols containing methyl branches), containing similar numbers of carbon atoms, such as can be made by the oxo process starting with internal olefins under conditions where the double bond can migrate. Of course, mixtures can be made by mixing the corresponding compounds, but this is likely to be economically unattractive. Commercially available branched primary alcohols can be substantially pure or can include up to about 50% of substantially linear alcohols. In such mixed materials the proportion of branches material having branches at least two carbon atoms long is usually at least about 30%, more usually about 40% and the proportion of branched material having branches at least three carbon atoms long is usually at least about 20%, more usually about 30%. On alkoxylation, such materials give mixtures of linear and methyl branched alcohol alkoxylates and compounds of the formula (I).

The dispersing agent used in making the pigment dispersion of this invention may include other surface active agents. In particular, such other surfactants are other alcohol alkoxylates, particular ethoxylates. Typically such other ethoxylates are linear or substantially linear materials (see above). The proportion of branched primary alkyl compounds of the formula (I) (having branches at least two carbon atoms long in the alkyl chain) used in practical dispersing agents is desirably at least about 30% and more usually at least about 40%. Desirably, the proportion of branched material having branches at least three carbon atoms long is at least about 30%, more usually at about least 30%. Overall the proportion of branched material (including methyl branching) is typically at least about 40% and more usually at least about 50%. The specific proportion of branched alcohol ethoxylate used may depend on the nature of the pigment being dispersed (see further below).

This invention is applicable to the manufacture of aqueous dispersions of a wide range of pigments especially for ultimate use in paints or other surface coatings. The specific pigments referred to below by Colour Index references are sometimes shortened to the colour and the number i.e. omitting the phrase "C.I. Pigment" from the full reference. Suitable pigments include inorganic pigments such as titanium dioxide, pigmentary iron oxide ($Fe_2O_3$) and organic pigments such as phthalocyanine blue and green pigments, for example various forms of Blue 15, such as Heliogen blue L 7080 from BASF (Blue 15:3), Monastral blue FGX from Zeneca (Blue 15:4), Phthalocyanine blue from Minerva (Blue 15) and Heliogen blue L 6920 from BASF (Blue 15:1) and Green 7 such as Monastral green GNX-C from Zeneca and Heliogen green L 8730 from BASF; butanamide pigments for example Yellow 74, such as Hansa Bright yellow 2GX70 from Hoechst; naphthcarboxamide pigments for example Red 112 and Red 170, such as Sico Echtrot L 3855 from BASF (Red 112) and Novoperm red 3RK70 from Hoechst (Red 170); indolodioxazine pigments for example Violet 23, such as Monolite violet RN from Zeneca; benzimadazole pigments for example Orange 36, such as Novoperm orange HL70 from Hoechst; azo pigments for example Yellow 155, such as Sandorin Jaune 5GD from Clariant: and diazo pigments for example Red 214 such as Sandorin Rouge BN-P from Clariant; and carbon black, and similar materials.

Among the organic pigments, a division by specific surface area (e.g. as measured by the BET method) can be noted. Generally there are two groups of pigments a first group with a relatively low BET surface area e.g. from 10 to 40 m².g⁻¹, particularly the red, orange and yellow pigments, and a second group with a relatively high BET surface area e.g. from 40 to 80 m².g⁻¹ (or possibly higher), particularly blue and green, phthalocyanine pigments, and violet pigments. For pigments with a relatively low BET surface area e.g. up to about 40 m².g⁻¹, particularly from 10 to 40 m².g⁻¹, particularly from 10 to 30 m².g⁻¹, more particularly those which are red, orange and yellow pigments it is advantageous to use a dispersing agent with a high proportion of branched chain alkyl moieties so that it is thus desirable that the proportion of branched alkyl compounds of the formula (I) in the dispersing agent used is at least 75%, more usually at least 85% and will usually be at least 95% e.g. about 100%. For pigments with a relatively high BET surface area e.g. at least 40 m².g⁻¹, particularly from 40 to 80 m².g⁻¹, more particularly at least about 60 m².g⁻¹, particularly those which are blue, green and violet pigments, the proportion of branched chain alkyl moieties is less important, but it is advantageous to use a dispersing agent with relatively longer alkoxylate chains e.g. 15 to 30 alkoxylate, particularly ethoxylate residues. The proportion of branched chain alkyl moieties in such cases will typically be at least 40% and more usually at least about 50%, but can be higher if desired. For organic pigments having intermediate BET values, particularly between 30 and 60 m².g⁻¹, it can be advantageous to use dispersants of the formula (I) where the total number of carbon atoms in the alkyl residue is from 10 to 15, and the polyalkylene oxide chain contains from 7 to 15 residues, particularly ethylene oxide residues.

The invention accordingly includes:

an aqueous dispersion of an organic pigment having a BET surface area of up to about 40 m².g⁻¹, particularly from 10 to 40 m².g⁻¹, particularly a red, orange and/or yellow pigment, which includes an alcohol alkoxylate dispersant in which at least at least 75%, particularly at least 85% and especially at least 95% e.g. about 100% of the alcohol alkoxylate dispersant is at least one branched primary alcohol alkoxylate of the formula (1):

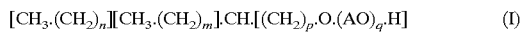

[CH₃.(CH₂)ₙ][CH₃.(CH₂)ₘ].CH.[(CH₂)ₚ.O.(AO)_q.H]    (I)

where n and m are each independently from 1 to 13; and p is 1 or 2;

such that n+m+p is from 5 to 19, particularly from 7 to 15;

AO is an alkylene oxide residue having from 2 to 4 carbon atoms and is particularly an ethylene oxide residue, a propylene oxide residue or a mixture of ethylene oxide and propylene oxide residues; and q is from 5 to 40;

and an aqueous dispersion of an organic pigment having a BET surface area of at least 40 m².g⁻¹, particularly from 40 to 80 m².g⁻¹, particularly a blue, green and/or violet pigment which includes an alcohol alkoxylate dispersant in which at least at least 40% of the alcohol alkoxylate dispersant is at least one branched primary alcohol alkoxylate of the formula (I):

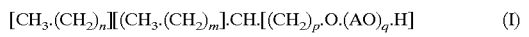

[CH₃.(CH₂)ₙ][(CH₃.(CH₂)ₘ].CH.[(CH₂)ₚ.O.(AO)_q.H]    (I)

where n and m are each independently from 1 to 13; and p is 1 or 2;

such that n+m+p is from 5 to 19, particularly from 7 to 15;

AO is an alkylene oxide residue having from 2 to 4 carbon atoms and is particularly an ethylene oxide residue, a propylene oxide residue or a mixture of ethylene oxide and propylene oxide residues; and q is from 15 to 30.

The present invention is particularly applicable to dispersions of pigments for ultimate use in paints. Accordingly, the invention includes the a paint including a pigment dispersion of this invention.

The amount of surfactant used in the dispersants of the invention depends on the specific materials employed and the concentration of pigment in the dispersion required. For inorganic pigments, such as titanium dioxide and iron oxide pigment, the amount used is typically in the range 0.02 to 10%, commonly 0.05 to 5% and more usually 0.1 to 2.5%, by weight of the pigment; for organic pigments such as phthalocyanines, somewhat higher levels of dispersant may be used, typically in the range 0.02 to 50%, more usually from 0.1 to 30%, by weight of the pigment; and for carbon black the amount of dispersant is typically in the range 0.02 to 30%, more usually from 0.1 to 20%, by weight of the pigment.

According to this invention desirably more that 40% of the dispersant used is an alcohol alkoxylate dispersant of the formula (I) above.

Typical primary dispersions made according to this invention can contain up to about 75%, often up to about 65%, of inorganic pigment or up to about 55% by weight organic pigment.

When incorporated into end use products such as paints or surface coatings typical pigment levels on the final product will be from about 0.02 to about 12%, particularly about 0.1 to about 10%, pigment by weigh based on the total paint or surface coating. Where coloured inorganic pigments are used, the levels will typically be from about 0.05 to about 12%, particularly about 0.2 to about 10%, for white pigments, particularly titanium dioxide, the pigment may be present to provide opacity and not just colour and will often be present at concentrations e.g. in base paint formulations, of up to 25%, typically from 0.2 to 25%, by weight; for organic pigments, especially phthalocyanine pigments, the levels will typically be up to about 8% typically from about 0.05 to about 8%, particularly about 0.1 to about 5%; and for carbon black the levels will typically be from about 0.05 to about 8%, particularly about 0.2 to about 5%.

The continuous phase in such dispersions will usually be water, but may include non-aqueous miscible vehicle or solvent such as glycols in an amount of up to 50% e.g. 2 to 15%, by weight of the overall vehicle.

Other components that can be included in primary dispersions according to the invention include:

wetting agents, such as alcohol ethoxylates e.g. C₉ to C₁₁ alcohol 6 to 9 ethoxylates, and anionically modified alcohol ethoxylates such as the corresponding sulphosuccinates, typically used at from 0.2 to 5%, more usually from 0.5 to 3% by weight of the pigment, can contribute to lower viscosity and/or greater stability of the pigment dispersions, particularly where organic red and blue pigments e.g. phthalocyanine blue pigments, are being dispersed;

antifoam or defoam agents, particularly silicone (organopolysiloxane) or mineral oil based materials, typically used in an amount of from 0.25 to 3, more usually from 0.5 to 2% by weight of the primary pigment dispersion;

base e.g. ammonia to adjust the pH;

humectant such as ethoxylated sorbitols, typically in an amount of 0 to 15%, more usually 2 to 10% by weight of the dispersion;

thickeners to adjust the viscosity e.g. when a dispersion with a relatively low pigment loading (and thus a low viscosity) is intended for inclusion in a relatively viscous end use base, in an amount of up to 5% e.g. 0.5 to 3% by weight of the dispersion; and biocides in a suitably effective amount, typically up to 1% by weight of the formulation.

Further components that can be included in or added to pigment dispersions, particularly to provide specific properties in the end use product, particularly paint, include:

grinding resins, which are resins included in the pigment dispersion before grinding the pigment dispersion to improve the incorporation of the pigment into the coating to obtain improved colour utilisation of the pigment when used these materials are typically present as from 1 to 40, more usually 10 to 30% by weight of the dispersion.

The dispersions of the invention can be made by conventional dispersing methods, although care may be needed to avoid (or inhibit) the formation of foam during dispersion.

The following Examples illustrate the invention. All parts and percentages are by weight unless otherwise stated.

| Materials | |
|---|---|
| AL1 | mixture of primary alcohols mainly having 12 to 15 carbon atoms and containing about 50% monobranched primary alcohol and about 50% linear primary alcohol made by the oxo process from internal olefin precursors |
| AL2 | 2-butyloctanol |
| AL3 | branched C18 alcohol made by the Guerbet process (2-heptylunadecan-1-ol) |

| Dispersants | |
|---|---|
| | Description |
| AC1 | Tween 80 - sorbitan mono-oleate 20-ethoxylate ex ICI Surfactants |
| AC2 | nonyl phenol 10EO (100%) ex ICI Surfactants |
| AE1 | AL1 10-ethoxylate |
| AE2 | AL1 20-ethoxylate |
| AE3 | AL2 10-ethoxylate |
| AE4 | AL2 20-ethoxylate |
| AE5 | AL1 15-ethoxylate |
| AE6 | AL3 13-ethoxylate |
| AE7 | AL3 20-ethoxylate |

| Pigments | | | | |
|---|---|---|---|---|
| | Commercial Name | Source | Colour Index name | BET* |
| P1 | Sandorin Jaune 5GD | Clariant | C. I. Pigment Yellow 155 | 31 |
| P2 | Hansa Bright yellow 2GX70 | Hoechst | C. I. Pigment Yellow 74 | 14 |
| P3 | Monastral green GNX-C | Zeneca | C. I. Pigment Green 7 | 45 |
| P4 | Heliogen green L 8730 | BASF | C. I. Pigment Green 7 | 61 |
| P5 | Heliogen blue L 7080 | BASF | C. I. Pigment Blue 15:3 | 63 |
| P6 | Monastral blue FGX | Zeneca | C. I. Pigment Blue 15:4 | 38 |
| P7 | Phthalocyanine blue | Minerva | C. I. Pigment Blue 15 | — |
| P8 | Heliogen blue L 6920 | BASF | C. I. Pigment Blue 15:1 | 72 |
| P9 | Sandorin rouge BP-N | Clariant | C. I. Pigment Red 214 | 36 |
| P10 | Sico Echtrot L 3855 | BASF | C. I. Pigment Red 112 | 37 |
| P11 | Novoperm red 3RK70 | Hoechst | C. I. Pigment Red 170 | 19 |
| P12 | Monolite violet RN | Zeneca | C. I. Pigment Violet 23 | 74 |
| P13 | Novoperm orange HL70 | Hoechst | C. I. Pigment Orange 36 | 17 | all pigments are treated as 100% active materials for formulation calculations
*BET = BET surface area

| Pigment dispersion | |
|---|---|
| Pintamix jaune | commercial pigment dispersion ex Clariant |

| Other | |
|---|---|
| Defoam | silicone based defoamer (30% active) |
| Wetter | sulphosuccinate wetter |
| NH$_3$OH | 10% aqueous ammonia |
| Tween 50 | ethoxylated sorbitan fatty acid ester ex ICI Surfactants |

Methods

Generally two types of mixer were used to make up pigment dispersions: a Red Devil Paint Shaker for small scale (100 g) preliminary work and a Dispermat SL-C for later work.

Red Devil Shaker—100 g of a mixture of the components of a pigment dispersion were placed in a 250 ml vessel 50 g 2 mm glass beads were added and the dispersion made by shaking for 1 hour at ambient temperature. The pigment dispersion was separated from the glass beads with a sieve.

Dispermat SL-C disperser—A small proportion of the formulation water was reserved and the dispersing agent dissolved in the remainder of the water. The pigment was mixed in by hand using a spatula and this pre-mix dispersed for 15 minutes on a Diaf AS high shear mixer at 1000 rpm (ca 17 Hz). The reserved water and antifoam were then added. The pre-mix and 100 ml of 1 mm glass beads were placed in the Dispermat which was then programmed with the following settings:

| Power | 0.3 to 1 k W |
|---|---|
| Time | 40 minutes |
| Pump | setting as required for circulation typically 50 |
| Speed | 2500 to 5500 rpm (ca 58 to 92 Hz) |
| Temp. | 30 to 40° C. |

Aging For some tests the pigment dispersions were aged. Aging extent is indicated as: '0'=no aging; '1 w'=1 week at ambient temperature; '1 w/40'=1 week at 40° C.; '1 m'=1 month at ambient temperature; '1 m/40'=1 month at 40° C.

Viscosity was measured using a Brookfield LVT viscometer at 25° C. The results are reported in mPa.s. Some tests were carried out under varied shear (rotational speed) conditions. Speeds of 12 rpm (ca 0.2 Hz), 30 rpm (0.5 Hz) and 60 rpm (1 Hz) were used.

pH was measured using a WTW pH537 pH meter.

Colour was measured with a Minolta CM-1000 spectrophotometer at 100 observer angle, using illuminant: D65. Results were recorded as CIE L*a*b* values. Results are difference values calculated from colour measurements. Two tests were done:

Colour Acceptance (ACC)—paint drawdowns were made from mixtures of 5 g pigment dispersion and 95 g white gloss base paint (conventional water based acrylic gloss paint pigmented with titanium dioxide) to which pigment dispersion was added. For the first drawdown, the pigment was dispersed in the base paint by hand, stirring with a spatula, for the second drawdown, the pigment dispersion was mixed into the base paint in a laboratory stirrer, typically at 300 rpm (5 Hz) for 2 minutes. Large colour differences between the two drawdowns indicate poor miscibility of the base paint and the pigment dispersion and thus poor Colour Acceptance. Colour Acceptance tests were run using fresh pigment dispersion and pigment dispersion subjected to storage (aging).

Colour Difference (DIFF)—is the measured colour difference between the drawdowns made using fresh and aged pigment dispersions machine mixed into the paint base in the Colour Acceptance test. These results give a measure of the stability of the pigment dispersions to aging.

Gloss was measured on paint drawdowns using a Dr Lange glossmeter at reflectance angles reported with the results which are reported as (%) gloss. Gloss difference (Gloss Diff.) values are (% gloss for a particular sample)—(% gloss for a corresponding sample of base paint). Results are reported 'Aged' for aged pigment dispersions and 'Store' for paint drawdowns stored for the stated period in daylight.

Drying time (DT)—was measured according to DIN 53150 (modified Bandow-Wolff) using a commercial semi-flat acrylic latex paint. The numerical ratings correspond to whether a strip of paper sticks to a painted sample after it has been applied to the sample under a given force (weight) and, in some cases whether or not removing the paper leaves a mark immediately after removal:

| Rating | 2 | 3 | 4 | 5 | 6 | 7 |
|---|---|---|---|---|---|---|
| Force (N) | 0.2 | 2 | 20 | 20 | 200 | 200 |
| Mark left | — | — | yes | no | yes | no |

Two measurements were made:

DT(A) Paint samples (95 g white gloss base paint+5 g pigment dispersion) were applied to a substrate and the drying state after predetermined times was recorded.

DT(B) Paint samples (85 g white gloss base paint+15 g pigment dispersion) were applied to a substrate and the time required to reach drying stage 6 was recorded.

Hardness was measured using the Persoz method, using a Persoz and Konig type 3034 hardness tester, on dried paint drawdowns 1 week and 1 month after formation to investigate how hardness changes with time. For some samples the pigment dispersions were aged as described above (indicated 'Aged').

Water Uptake—was measured by making paint drawdowns of a latex based paint including the pigment dispersion to give films about 150 μm thick. Samples of the paint film 3×8 cm were cut and weighed and the film was immersed in water for 2 weeks at 23° C. The wet stored film was surface dried with paper tissue and re-weighed. The water uptake is taken to be the weight difference expressed as a percentage of the latex paint film weight and is reported as Water (%). As paint sample weights were low, typically ca 0.75 g and weighings were to the nearest 10 mg, the technique does not have high quantitative resolution, but provides a useful indication that, in the event, water absorption was not a major issue.

Paint film drawdowns were made using an automatic paint film applicator (Braive) at an applicator speed of 3 for Colour Acceptance and Development tests and Gloss testing and 1 for paint film hardness and water uptake tests.

EXAMPLE 1

The dispersion of pigment Sandorin Jaune 5GD (P1) was investigated using two alcohol ethoxylates according to the invention, AE1 and AE5, and Tween 80 for comparison. The main experimental target was to obtain pigment dispersions of good dispersion (adequately low viscosity) which when incorporated into paint gave drying times that were shorter than the commercially available pigment dispersion Pintamix Jaune.

Initial tests were carried out at a pigment loading of 40% by weight of the total composition using a Red Devil Shaker to determine an appropriate level of dispersant (from the viscosity of the dispersions obtained) for use in later testing. 11% active dispersant by weight of the pigment was found to be appropriate and the formulation and viscosity results are set out below:

| Pigment | 40% w/w |
| dispersant | 11% (active on pigment) |
| Defoam | 0.5% w/w |
| water | to 100% w/w |

| Agent | Disp. No | Viscosity (mPa · s) |
|---|---|---|
| AC1 | C1.1 | 63 |
| AE1 | 1.1 | 83 |
| AE5 | 1a.1 | 152 |

Dispersion 1a.1 foamed more than expected in the Red Devil Shaker so for the subsequent dispersions using Agent AE5 a higher level of Defoam was used (1% on total composition). Further dispersions were made using the Dispermat having the having the following compositions:

| Dispersion | Amounts (pbw) | | | | |
|---|---|---|---|---|---|
| No | Agent | Agent | Pigment | Defoam | Water |
| C1.2 | AC1 | 3.3 | 30 | 0.5 | 66.2 |
| 1.2 | AE1 | 3.3 | 30 | 0.5 | 66.2 |
| 1a.2 | AE5 | 3.3 | 30 | 1 | 65.7 |

The effect of aging on viscosity and Colour Acceptance, Colour Development and Gloss in paints made from the pigment dispersions were investigated and the results are summarised below:

| Dispersion | | Viscosity (mPa · s) (at speed in rpm) | | | | Colour | | Gloss |
|---|---|---|---|---|---|---|---|---|
| No | Age | 12 | 30 | 60 | pH | ACC (Δ E) | DIFF (Δ E) | Diff (%) |
| C1.2 | 0 | 63 | 32 | 35 | 7.43 | 0.1 | — | 1.1 |
| | 1 w | 110 | 63 | 47 | — | — | — | — |
| | 1 w/40 | 125 | 75 | 54 | — | — | — | — |
| | 1 m | 47 | 25 | 29 | 6.72 | 0.1 | 0.2 | 1.0 |
| | 1 m/40 | 110 | 82 | 68 | 6.72 | 0.1 | 0.3 | 0.7 |

-continued

| Dispersion | | Viscosity (mPa · s) (at speed in rpm) | | | pH | Colour | | Gloss Diff (%) |
|---|---|---|---|---|---|---|---|---|
| No | Age | 12 | 30 | 60 | | ACC (Δ E) | DIFF (Δ E) | |
| 1.2 | 0 | 63 | 44 | 41 | 7.65 | 0.2 | — | 1.4 |
| | 1 w | 149 | 75 | 54 | — | — | — | — |
| | 1 w/40 | 164 | 88 | 69 | — | — | — | — |
| | 1 m | 47 | 25 | 32 | 7.05 | 0.2 | 0.4 | 1.3 |
| | 1 m/40 | 63 | 38 | 44 | 7.10 | 0.2 | 0.6 | 1.1 |
| 1a.2 | 0 | 78 | 44 | 32 | 6.51 | 0.2 | — | 1.3 |
| | 1 w | 86 | 47 | 44 | — | — | — | — |
| | 1 w/40 | 102 | 57 | 47 | — | — | — | — |
| | 1 m | 63 | 38 | 36 | 6.86 | 0.1 | 0.5 | 1.9 |
| | 1 m/40 | 63 | 38 | 36 | 7.14 | 0.1 | 0.4 | 2.4 |
| Pintamix jaune | 0 | 3929 | 2090 | 1373 | 7.56 | 0.8 | — | 3.3 |
| | 1 w | 5928 | 3058 | 1872 | — | — | — | — |
| | 1 w/40 | 6240 | 2996 | 1810 | — | — | — | — |
| | 1 m | 5148 | 2668 | 1654 | 7.38 | 1.4 | 1.2 | 2.3 |
| | 1 m/40 | 6240 | 3058 | 1841 | 7.34 | 1.6 | 1.2 | 2.0 |

The effect of aging on the drying behaviour in latex paints made using the pigment dispersions was investigated and the results are summarised below:

| Dispersion No | Aging | Drying stage after (mins) | | | | | | | Time to state 6 (mins) |
|---|---|---|---|---|---|---|---|---|---|
| | | 25 | 30 | 35 | 40 | 45 | 50 | 55 | 65 | |
| Fresh dispersions | | | | | | | | | | |
| base latex | — | — | — | 3 | 4 | 6 | 7 | | | — |
| C1.2 | 0 | — | — | 3 | 3/4 | 6 | 7 | | | 60 |
| 1.2 | 0 | — | — | 2 | 3/4 | 6 | 7 | | | 60 |
| 1a | 0 | — | — | 4 | 5 | 6 | 7 | | | 55 |
| Pintamix jaune | 0 | — | — | 2 | 3 | 4 | 5 | — | 7 | 130 |
| Aged dispersions | | | | | | | | | | |
| base latex | — | 2 | 2 | 5 | 6 | 7 | | | | — |
| C1.2 | 1 m | 2 | 3 | 5 | 6 | 7 | | | | 55 |
| | 1 m/40 | 2 | 3 | 5 | 6 | 7 | | | | 55 |
| 1.2 | 1 m | 2 | 3 | 4/5 | 6 | 7 | | | | 55 |
| | 1 m/40 | 2 | 3 | 4/5 | 6 | 7 | | | | 55 |
| 1a | 1 m | 2 | 3 | 5 | 6 | 7 | | | | 55 |
| | 1 m/40 | 2 | 3 | 5 | 6 | 7 | | | | 55 |
| Pintamix jaune | 1 m | 2 | 3 | 4 | 5 | 6 | 7 | | | 140 |
| | 1 m/40 | 2 | 3 | 4 | 5 | 6 | 7 | | | 140 |

EXAMPLE 2

The dispersion of pigment Sandorin Jaune 5GD (P1) was investigated using alcohol ethoxylate AE1 according to the invention and AC2 for comparison. Initial tests were carried out using a Red Devil Shaker to determine an appropriate level of dispersant (from the viscosity of the dispersions obtained) for use in later testing at pigment loadings of 35, 40 and 45% w/w. Formulation details and results for 40% pigment dispersions are reported. 11% active dispersant by weight of the pigment was found to be appropriate and the formulation and viscosity results are set out below:

| Pigment | 40% w/w |
|---|---|
| dispersant | 2 to 17% (active on pigment) |
| defoam | 1% w/w |
| water | to 100% w/w |

| | Viscosity (mPa · s) % Dispersant by weight on Pigmt | | | | | | | |
|---|---|---|---|---|---|---|---|---|
| Agent | 2 | 4 | 6 | 8 | 10 | 11 | 12 | 17 |
| AC2 | NP | NP | 63 | 88 | 94 | 112 | 178 | 428 |
| AE1 | NP | 100 | 69 | 103 | 124 | 168 | 213 | 556 |

Further dispersions were made using the Dispermat having the following compositions:

| Dispersion No | Agent | Amounts (pbw) | | | |
|---|---|---|---|---|---|
| | | Dispersant | Pigment | defoamer | water |
| C2.2 | AC2 | 4 | 40 | 0.5 | to 100 |
| 2.2 | AE1 | 4 | 40 | 0.5 | to 100 |

The effect of aging of the dispersions on viscosity and pH and the effect of dispersion aging on Colour Acceptance, Colour Development and Gloss in paints made from the pigment dispersions were investigated and the results are summarised below:

| Disp. No | Age | Viscosity (mPa · ) (speed in rpm) | | | pH | Gloss Diff (20°) | | Colour | |
|---|---|---|---|---|---|---|---|---|---|
| | | 12 | 30 | 60 | | Aged (%) | Store (%) | ACC (Δ E) | DIFF (Δ E) |
| C2.2 | 0 | 991 | 465 | 272 | 7.49 | 3.3 | 0.7 | 0.2 | — |
| | 1 w | 1046 | 500 | 266 | — | — | — | — | — |
| | 1 w/40 | 952 | 437 | 241 | — | — | — | — | — |
| | 1 m | 890 | 419 | 250 | 7.49 | 1.8 | — | 0.1 | 0.8 |
| | 1 m/40 | 640 | 344 | 228 | 7.49 | 2.7 | — | 0.2 | 0.9 |
| 2.2 | 0 | 156 | 103 | 89 | 6.95 | -0.5 | -0.1 | 0.3 | — |
| | 1 w | 172 | 107 | 94 | — | — | — | — | — |
| | 1 w/40 | 492 | 266 | 171 | — | — | — | — | — |
| | 1 m | 188 | 119 | 103 | 7.46 | 2.2 | — | 0.3 | 0.8 |
| | 1 m/40 | 390 | 238 | 172 | 7.43 | -0.3 | — | 0.7 | 0.7 |

The effect of the pigment dispersions on hardness and water uptake of paints made using them was investigated and the results are summarised below:

| Dispersion | | Hardness | | Hardness (Aged) | | water |
|---|---|---|---|---|---|---|
| No | Age | 1 week | 1 month | 1 week | 1 month | (%) |
| base paint | — | 96.3 | 106 | 92.6 | 77.6 | 8.33 |
| C2.2 | 0 | 100 | 106.3 | — | — | — |
|  | 1 m | — | — | 93.6 | 75 | 10.97 |
|  | 1 m/140 | — | — | 93.6 | 75.6 | — |
| 2.2 | 0 | 95 | 102.3 | — | — | 7.57 |
|  | 1 m | — | — | 89.6 | 74 | — |
|  | 1 m/140 | — | — | 88 | 74.3 | — |

EXAMPLE 3

The dispersion of pigment Monastral green GNX-C (P3) was investigated using two alcohol ethoxylates, AE1 and AE3, according to the invention and AC2 for comparison using the Red Devil Shaker technique described in Example 2 above. 11% active dispersant by weight of the pigment was found to be appropriate and the formulation and viscosity results are set out below:

| Formulation | |
|---|---|
| Pigment | 50% w/w |
| dispersant | 2 to 17% (active on pigment) |
| defoam | 1% w/w |
| water | to 100% w/w |

| | Viscosity (mPa · s) % Dispersant by weight on Pigmt | | | | | | |
|---|---|---|---|---|---|---|---|
| Agent | 2 | 4 | 6 | 8 | 10 | 11 | 12 | 17 |
| AC2 | NP | NP | 88 | 81 | 100 | 135 | 294 | 999 |
| AE1 | NP | 125 | 72 | 107 | 135 | 225 | 546 | 1466 |
| AE3 | — | NP | 113 | 86 | 110 | 185 | 670 | 2212 |

These data suggest that appropriate levels of dispersant to use for this pigment are in the range 6 to 11% by weight on the pigment. Subsequent testing of further samples used a level of 10% by weight on the pigment. The compositions made up using the Dispermat were as follows:

| Dispersion | | Amounts (pbw) | | | |
|---|---|---|---|---|---|
| No | Agent | Dispersant | Pigment | Defoam | water |
| C3.1a | AC2 | 5 | 50 | 1.5 | 43.5 |
| 3.1a | AE1 | 5 | 50 | 1.5 | 43.5 |
| 3.2a | AE3 | 5 | 50 | 1.5 | 43.5 |

The effect of aging on viscosity and pH was investigated and the results are summarised below:

| Dispersion | | Viscosity (mPa · s) (speed in rpm) | | | |
|---|---|---|---|---|---|
| No | Age | 12 | 30 | 60 | pH |
| C3.1a | 0 | 320 | 238 | 197 | 8.06 |
|  | 1 w | 578 | 362 | 366 | — |
|  | 1 w/40 | 1139 | 687 | 481 | — |
|  | 1 m | 765 | 453 | 300 | 8.16 |
|  | 1 m/40 | 1872 | 1310 | 866 | 8.03 |
| 3.1a | 0 | 422 | 306 | 244 | 7.96 |
|  | 1 w | 718 | 450 | 319 | — |
|  | 1 w/40 | 1123 | 674 | 450 | — |
|  | 1 m | 1014 | 600 | 396 | 8.03 |
|  | 1 m/40 | 1638 | 1077 | 733 | 7.91 |
| 3.2a | 0 | 203 | 156 | 144 | 7.88 |
|  | 1 w | 203 | 163 | 144 | — |
|  | 1 w/40 | 788 | 574 | 443 | — |
|  | 1 m | 235 | 150 | 140 | 8.00 |
|  | 1 m/40 | 3978 | 2559 | 1716 | 7.91 |

The effect of the pigment dispersions and their aging on Colour Acceptance, Colour Development, Gloss, Hardness and Water Uptake in paints made from the pigment dispersions were investigated and the results are summarised below:

| | | Gloss | | Colour | | Hardness change | | Water |
|---|---|---|---|---|---|---|---|---|
| Disper- | | Aged | Store | ACC | DIFF | (%) | | ter |
| sion No | Age | (%) | (%) | ($\Delta$ E) | ($\Delta$ E) | 1 w | 1 m | (%) |
| base | — | n/a | −8.5 | — | — | — | — | 7.85 |
| C3.1a | 0 | −16.3 | −9.8 | 0.2 | — | −1.1 | −1.3 | 7.54 |
|  | 1 m | −12.2 | — | 0.6 | 0.7 | 2.1 | 0 | — |
|  | 1 m/40 | −13.4 | — | 0.6 | 0.6 | 3.7 | −1.7 | — |
| 3.1a | 0 | −15 | −10.9 | 0.3 | — | −5.1 | −4.6 | 6.52 |
|  | 1 m | −11.8 | — | 0.5 | 0.4 | −0.6 | 3.7 | — |
|  | 1 m/40 | −14 | — | 0.6 | 0.4 | 0 | −3.4 | — |
| 3.2a | 0 | −12.3 | −11 | 0.3 | — | 1.4 | 5.2 | 7.89 |
|  | 1 m | −15.4 | — | 0.3 | 0.9 | −0.5 | — | — |
|  | 1 m/40 | −12 | — | 0.6 | 0.5 | −1.8 | — | — |

EXAMPLE 4

The dispersion of pigment Sandorin Jaune 5GD (P1) was investigated using alcohol ethoxylate AE3 according to the invention and AC2 for comparison using the Red Devil Shaker technique described in Example 2 above.

| Formulation | |
|---|---|
| Pigment | 40% w/w |
| dispersant | 4 to 17% (active on pigment) |
| defoamer | 1% w/w |
| water | to 100% w/w |

| | Viscosity (mPa · s) Dispersant (% on pigment) | | | | | | | |
|---|---|---|---|---|---|---|---|---|
| Agent | 4 | 6 | 8 | 10 | 11 | 12 | 14 | 17 |
| AC2 | NP | 63 | 88 | 94 | 112 | 178 | 250 | 428 |
| AE3 | — | NP | 75 | 92 | 140 | 169 | 260 | 382 |

These data suggest that appropriate levels of dispersant to use for this pigment are in the range 6 to 12% by weight on the pigment. Subsequent testing of further samples used a level of 10% by weight on the pigment. The compositions made up using the Dispermat were as follows:

| Dispersion | | Amounts (pbw) | | | |
|---|---|---|---|---|---|
| Agent | No | Agent | Pigment | Defoam | water |
| AC2 | C4.1.a | 4 | 40 | 1.5 | 54.5 |
| AE3 | 4.1a | 4 | 40 | 1.5 | 54.5 |

The effect of aging on viscosity and pH was investigated and the results are summarised below:

| Dispersion | | Viscosity (mPa · s) (speed in rpm) | | | |
|---|---|---|---|---|---|
| No | Age | 12 | 30 | 60 | pH |
| C4.1.a | 0 | 991 | 465 | 272 | 7.49 |
| | 1 w | 1046 | 500 | 266 | — |
| | 1 w/40 | 952 | 437 | 241 | — |
| | 1 m | 890 | 419 | 250 | 7.49 |
| | 1 m/40 | 640 | 344 | 228 | 7.54 |
| 4.1a | 0 | 94 | 63 | 63 | 8.05 |
| | 1 w | 102 | 72 | 71 | — |
| | 1 w/40 | 406 | 284 | 211 | — |

| Dispersion | | Viscosity (mPa · s) (speed in rpm) | | | |
|---|---|---|---|---|---|
| No | Age | 12 | 30 | 60 | pH |
| | 1 m | 125 | 82 | 80 | 8.11 |
| | 1 m/40 | 1732 | 918 | 561 | 8.02 |

The effect of the pigment dispersions and their aging on Gloss, Colour acceptance, paint Hardness and water uptake in paints made from the pigment dispersions were investigated and the results are summarised below:

| Disper-sion No | Age | Gloss ° Aged (%) | Gloss ° Store (%) | Colour ACC (Δ E) | Colour DIFF (Δ E) | Hardness change (%) 1 w | Hardness change (%) 1 m | Wa-ter (%) |
|---|---|---|---|---|---|---|---|---|
| base | — | n/a | −6.1 | — | — | — | — | 8.33 |
| C4.1a | 0 | 4.1 | −9.6 | 0.2 | — | 3.8 | 0.2 | 10.97 |
| | 1 m | 2.8 | — | 0.1 | 0.8 | 1.0 | −3.3 | — |
| | 1 m/40 | 4.3 | — | 0.2 | 0.9 | 1.0 | −2.5 | — |
| 4.1a | 0 | −0.9 | −6.3 | 0.4 | — | −7.2 | −5.3 | 8.51 |
| | 1 m | −2.7 | — | 0.8 | 0.8 | −3.2 | −7.1 | — |
| | 1 m/40 | −8.2 | — | 0.6 | 1.4 | −4.7 | −7.1 | — |

EXAMPLE 5

A matrix experiment was conducted to see how the performance of the ethoxylates used in this invention disperse a range of commercial pigments. Dispersions were made up as described above using the Red Devil Shaker at various pigment levels (Load,(%)) and a dispersing agent concentration of 11% by weight of the pigment with 1% Defoam. Dispersion viscosities were measured at a speed of 60 rpm (1 Hz). The results are tabulated below. 'NP' indicates that a non-pourable paste was obtained.

| Load (%) | Agent | Pigments used | | | | | | | | | | | | |
|---|---|---|---|---|---|---|---|---|---|---|---|---|---|---|
| | | P1 | P2 | P3 | P4 | P5 | P6 | P7 | P8 | P9 | P10 | P11 | P12 | P13 |
| 35 | AE2 | 66 | NP | 35 | 35 | 33 | 44 | 39 | 16 | 269 | 110 | 835 | 35 | 64 |
| | AE4 | 44 | 61 | 30 | 31 | 35 | 43 | 38 | 32 | 162 | 82 | 107 | 39 | 47 |
| | AE1 | 58 | 60 | 32 | 32 | 36 | 46 | 39 | 19 | 128 | 68 | 144 | 39 | 44 |
| | AE3 | 52 | 35 | 27 | 44 | 47 | 83 | 44 | 32 | 72 | 53 | 93 | 66 | 57 |
| 40 | AE2 | 205 | NP | 44 | 49 | 60 | 71 | 63 | 19 | NP | 398 | 2808 | 63 | 103 |

-continued

| Load (%) | Agent | P1 | P2 | P3 | P4 | P5 | P6 | P7 | P8 | P9 | P10 | P11 | P12 | P13 |
|---|---|---|---|---|---|---|---|---|---|---|---|---|---|---|
| | AE4 | 80 | 231 | 41 | 49 | 58 | 80 | 82 | 36 | 300 | 462 | 228 | 94 | 108 |
| | AE1 | 156 | 554 | 41 | 44 | 66 | 85 | 60 | 25 | 593 | 302 | 281 | 69 | 81 |
| | AE3 | 113 | 58 | 36 | 113 | 71 | 125 | 68 | 41 | 158 | 183 | 161 | 78 | 107 |
| 45 | AE2 | NP | NP | 119 | 100 | 172 | 281 | 135 | 47 | NP | 2652 | 5304 | 135 | NP |
| | AE4 | 936 | 812 | 66 | 100 | 91 | 205 | 133 | 54 | 1467 | 1685 | 440 | 253 | 259 |
| | AE1 | 936 | 2496 | 69 | 88 | 225 | 138 | 119 | 38 | 1389 | 983 | 531 | 983 | — |
| | AE3 | 890 | 119 | 55 | 300 | 250 | 284 | 153 | 85 | 1124 | 390 | 306 | NP | 227 |
| 50 | AE2 | — | — | 462 | 356 | 1092 | 2060 | 788 | 136 | — | — | — | — | NP |
| | AE4 | — | — | 191 | 400 | 362 | 1476 | 550 | 108 | — | — | — | — | 1280 |
| | AE1 | — | — | 234 | 312 | 967 | 1131 | 375 | 181 | — | — | — | — | — |
| | AE3 | — | — | 190 | NP | 1201 | 1482 | 890 | 387 | — | — | — | — | 1124 |
| 55 | AE2 | — | — | 5304 | 2286 | — | — | — | — | — | — | — | — | — |
| | AE4 | — | — | 1904 | 2808 | — | — | — | — | — | — | — | — | — |
| | AE1 | — | — | 773 | — | — | — | — | — | — | — | — | — | — |
| | AE3 | — | — | 1014 | NP | — | — | — | — | — | — | — | — | — |

These data indicate that all the dispersing agents are effective for a range of pigments. However some general trends are notable. The pigments can be broadly divided into a first group of those with a relatively low BET surface area e.g. from 10 to 40 $m^2.g^{-1}$, particularly the red, orange and yellow pigments, and a second group of those with a relatively high BET surface area e.g. from 40 to 80 $m^2.g^{-1}$ (or possibly higher), particularly blue, green and violet pigments, among those tested. For red, orange and yellow pigments (relatively low BET surface area) it is advantageous to use a dispersing agent with a high proportion of branched chain alkyl moieties and within this broadly the lower the BET surface area, the better the dispersing agents with relatively shorter alkoxylate chains perform best. For blue, green and violet pigments (relatively high BET surface area) it is advantageous to use a dispersing agent with relatively longer alkoxylate chains and the alkyl moiety (hydrophobe) seems less critical even though the presence of branched chain alkyl moieties does appear to contribute to good results.

EXAMPLE 6

Various pigments were dispersed using appropriate dispersants AE1, AE7 and AE6, with AC2 used for comparison. The dispersions had the following composition:

| | | Pigment | | Dispersant | | | | | |
|---|---|---|---|---|---|---|---|---|---|
| Ex No | | type | amount (g) | type | amount (g) | wetter (g) | Defoam (g) | NH3OH (g) | water |
| EV-1521-15/1 | C6.1 | P1 | 200 | AE1 | 20 | — | 7.5 | — | 272.5 |
| EV-1521-15/2 | 6.1 | P1 | 200 | AC2 | 20 | — | 7.5 | — | 272.5 |
| Ev-1596-11/1 | 6.2 | P11 | 200 | AE7 | 24 | 15.9 | 7.5 | 2 | 250.6 |
| EV-1596-13/1 | 6.3 | P8 | 205 | AE1 | 41 | 16.35 | 5.75 | 1.9 | 230 |
| EV-1596-42/1 | 6.4 | P2 | 225 | AE6 | 22.5 | 12 | 7 | 2.5 | 231 |
| EV-159B-54/3 | 6.5 | P10 | 200 | AE6 | 36 | 15.9 | 7 | 2.5 | 238.6 |
| EV-1596-21/9 | C6.2 | P3 | 250 | AE1 | 25 | 4.46 | 7 | 2 | 211.54 |
| EV-1596-21/10 | 6.6 | P3 | 250 | AC2 | 25 | 4.46 | 7 | 2 | 211.54 |

The Dispersions were made in a Dispermat SL-C and the dispersion conditions used (all with a pump setting of 50) and the measured viscosity of the fresh and aged dispersions are set out in the table below. The viscosity of the dispersions fresh and on storage were measured and thees data are included in the table.

| Ex No | speed (rpm) | power (Watt) | time (min) | Temp (° C.) | Viscosity (mPa · s) | | | | |
|---|---|---|---|---|---|---|---|---|---|
| | | | | | 0 | 1 W | 1 M | 3 M | 6 M |
| EV-1521-15/1 | C6.1 | 2500 | 350 | 40 | 33–34 | 272 | 266 | 250 | 270 | 275 |
| EV-1521-15/2 | 6.1 | 2500 | 350 | 40 | 33–34 | 89 | 94 | 103 | 89 | 99 |
| Ev-1596-11/1 | 6.2 | 5250 | 900 | 40 | 38–40 | 372 | 372 | 438 | 539 | 745 |
| EV-1596-13/1 | 6.3 | 5000 | 900 | 40 | 37–40 | 200 | 210 | 263 | 309 | 440 |
| EV-1596-42/1 | 6.4 | 4000 | 660 | 40 | 35–37 | 428 | 390 | 367 | 405 | 385 |
| EV-159B-54/3 | 6.5 | 5000 | 600 | 40 | 38–40 | 1046 | 1021 | 1021 | 1030 | — |
| EV-1596-21/9 | C6.2 | 3500 | 350 | 40 | 26–28 | 488 | 592 | 609 | 734 | 656 |
| EV-1596-21/10 | 6.6 | 3500 | 520 | 40 | 26–28 | 936 | 1092 | 1092 | 1170 | 983 |

What is claimed is:

1. An aqueous dispersion of a pigment which includes as a dispersant at least one branched primary alcohol alkoxylate of the formula (I)

$$\{CH_3.(CH_2)_n\}\{CH_3.(CH_2)_m\}.CH.\{(CH_2)_p.O.(AO)_q.H\} \quad (I)$$

where n+m are each independently from 1 to 13; and p is 1 or 2; such that n+m+p is from 5 to 19;

AO is an alkylene oxide residue having from 2 to 4 carbon atoms; and q is from 5 to 40.

2. A dispersion as claimed in claim 1 in which n and m are each independently at least 2 and not more than 12; p is 1 and the total number of carbon atoms in the branched alkyl residue is from 10 to 20.

3. A dispersion as claimed in claim 1, in which the alkylene oxide groups are ethylene oxide residues.

4. A dispersion as claimed in claim 1, which further comprises at least one other surface active agent.

5. A paint including a pigment dispersion as claimed in claim 1.

6. A dispersion as claimed in claim 1, wherein the sum n+m+p is from 7 to 17.

7. A dispersion as claimed in claim 1, wherein AO is a propylene oxide residue.

8. A dispersion as claimed in claim 1, wherein q is from 5 to 25.

9. A dispersion as claimed in claim 1, in which the proportion of branched primary alkyl compounds of the formula (I) in the dispersing agent is at least 30%.

10. A dispersion as claimed in claim 9, in which the proportion of branched primary alkyl compounds of the formula (I) in the dispersing agent is at least 50%.

11. A dispersion as claimed in claim 1, wherein AO is a mixture of ethylene oxide and propylene oxide residues.

12. A dispersion as claimed in claim 11, wherein the molar ratio of ethylene oxide residues to propylene oxide residues is from 1:5 to 10:1.

13. A dispersion as claimed in claim 1 in which the pigment is an inorganic pigment and the dispersing agent is used in an amount of from 0.02 to 10% by weight of the pigment; or the pigment is an organic pigment organic pigment and the dispersing agent is used in an amount of from 0.02 to 50% by weight of the pigment; or the pigment is carbon black and the dispersing agent is used in an amount of from 0.02 to 30% by weight of the pigment.

14. A paint including a pigment dispersion as claimed in claim 13.

15. A dispersion as claimed in claim 1 in the form of a primary pigment dispersion in which the amount of pigment is up to 75% of inorganic pigment or up to 55% by weight organic pigment.

16. A paint including a pigment dispersion as claimed in claim 15.

17. A aqueous dispersion of an organic pigment having a BET surface area of up to about 40 $m^2.g^{-1}$ which includes an alcohol alkoxylate dispersant in which at least at least 75% of the alcohol alkoxylate dispersant is at least one branched primary alcohol alkoxylate of the formula (I):

$$[CH_3.(CH_2)_n][CH_3.(CH_2)_m].CH.[(CH_2)_p.O.(AO)_q.H] \quad (I)$$

where n and m are each independently from 1 to 13; and p is 1 or 2;

such that n+m+p is from 5 to 19;

AO is an alkylene oxide residue having from 2 to 4 carbon atoms; and q is from 5 to 40.

18. A paint including a pigment dispersion as claimed in claim 17.

19. An aqueous dispersion of an organic pigment having a BET surface area of at least 40 $m^2.g^{-1}$ which includes an alcohol alkoxylate dispersant in which at least at least 40% of the alcohol alkoxylate dispersant is at least one branched primary alcohol alkoxylate of the formula (I):

$$[CH_3.(CH_2)_n][CH_3.(CH_2)_m].CH.[(CH_2)_p.O.(AO)_q.H] \quad (I)$$

where n and m are each independently from 1 to 13; and p is 1 or 2;

such that n+m+p is from 5 to 19;

AO is an alkylene oxide residue having from 2 to 4 carbon atoms; and q is from 15 to 30.

20. A paint including a pigment dispersion as claimed in claim 19.

* * * * *